United States Patent
Murray et al.

[19]

[11] Patent Number: 6,073,186
[45] Date of Patent: Jun. 6, 2000

[54] LOW SPEED SERIAL BUS PROTOCOL AND CIRCUITRY

[75] Inventors: David E. Murray, Houston; David R. Wooten, Spring, both of Tex.

[73] Assignee: Compaq Computer Corporation

[21] Appl. No.: 08/796,978

[22] Filed: Feb. 7, 1997

Related U.S. Application Data

[62] Division of application No. 08/578,168, Dec. 29, 1995, Pat. No. 5,819,051.

[51] Int. Cl.[7] ................................................ G06F 13/00
[52] U.S. Cl. ............................................ 710/11; 710/60
[58] Field of Search ............................ 370/439, 286, 370/327; 380/31; 341/144; 702/64; 710/103, 55; 713/400, 310; 709/249

[56] References Cited

U.S. PATENT DOCUMENTS

| | | | |
|---|---|---|---|
| 4,608,700 | 8/1986 | Kirtley, Jr. et al. ................ | 370/439 |
| 4,658,436 | 4/1987 | Hill ........................................ | 380/31 |
| 4,785,396 | 11/1988 | Murphy et al. ..................... | 395/286 |
| 4,860,193 | 8/1989 | Bentley et al. ...................... | 710/55 |
| 5,233,350 | 8/1993 | Khim .................................... | 341/144 |
| 5,265,093 | 11/1993 | Dissosway et al. ................ | 370/327 |
| 5,319,765 | 6/1994 | Kimura ................................ | 395/491 |
| 5,432,907 | 7/1995 | Picazo, Jr. et al. ................ | 709/249 |
| 5,444,644 | 8/1995 | Divjak .................................. | 702/64 |
| 5,579,305 | 11/1996 | Norrell et al. ....................... | 370/286 |
| 5,590,292 | 12/1996 | Wooten et al. ..................... | 395/825 |
| 5,675,813 | 10/1997 | Holmdahl ............................ | 713/310 |
| 5,696,949 | 12/1997 | Young ................................... | 713/400 |
| 5,781,744 | 7/1998 | Johnson et al. ..................... | 710/103 |

OTHER PUBLICATIONS

Compaq Deskpro 386/20™ Technical Reference Guide, vol. I, Ch. 2, System Board, Keyboard Interface and Controller, pp. 2–86 to 2–100, 1987.

Technical Manual for the System/2 Mouse (date unknown).

Compaq Deskpro 386/20™ Technical Reference Guide, Vol. II, Ch. 5, System Board, Keyboard Interface and Controller, pp. 5–1 to 5–37, 1987.

*Primary Examiner*—Hoa T. Nguyen
*Assistant Examiner*—David Ton
*Attorney, Agent, or Firm*—Sharp, Comfort & Merrett, P.C.

[57] ABSTRACT

A serial bus communications method and circuitry for low speed serial bus functions. Over a two-wire communications channel, a unidirectional clock line and a bidirectional data line are used to transfer data. A protocol defines permissions, acknowledgments, terminations and retries handshaking between points. Circuitry is provided for reducing the latency of the serial bus when cooperating with the low speed functions. A resistive connection scheme is disclosed for converting high voltage signals into lower voltage signals.

35 Claims, 6 Drawing Sheets

LOW SPEED SERIAL BUS PROTOCOL AND CIRCUITRY

This is a divisional of application Ser. No. 08/578,168 filed Dec. 29, 1995, now U.S. Pat. No. 5,819,051.

BACKGROUND OF THE INVENTION

1. Field of the Invention

The invention relates to a serial bus capable of communicating with many serial bus devices, and more particularly to a protocol and latency reduction circuit for communicating with low speed serial bus devices.

2. Description of the Related Art

Computer systems are becoming ever more powerful with each passing moment. Many new advanced bus structures such as the PCI or Peripheral Component Interchange bus have been developed to allow greater performance of the computer system. Additionally, new devices and uses are being developed for the computer systems. In the past the computer has been essentially a stand-alone device or networked with other computer systems. However, today the modern personal computer is becoming a much more connected and multimedia oriented system. For example, now high speed video and audio functions are becoming commonplace and the integration with the telephone system has already begun.

However, many of these new features are well below the ultimate bandwidth or capability of the advanced buses such as the PCI bus. Therefore, it is not efficient to connect each one of the new functions and devices to the PCI bus directly, as this would impact bus loading and greatly increase overall costs. Additionally, many of these new functions are essentially serial in nature, with the data transferred in a bit stream rather than over a parallel bus structure. This is provided for many reasons, such as reduced wiring costs, and can be done because of the lower data rates which are required.

Therefore, it has been proposed to develop a serial bus architecture to connect all of these various lower bandwidth devices. The serial bus is organized with a host controller having a series of ports, which can then be connected either directly to devices or functions or to further hubs which have below them further devices or functions. A hub or the host controller may in addition incorporate functions if desired. In this manner a tree structure can be developed to allow a reasonable number of functions or devices to be attached to the serial bus system. The host controller connects to a bus in the computer system, for example the PCI bus, through the host controller. By having the host controller act as a concentrator, only a single connection to the PCI bus is necessary. The connection is better able to utilize the performance of the PCI bus without requiring numerous connections.

The host controller, each hub, and each function or port contain particular control registers for doing set up and initialization operations. In addition, four basic types of data transfer are defined in the serial bus system. The first type is isochronous, which is effectively a continuous real time transfer, such as telephony information or audio information. The second type is asynchronous block transfers, such as printer operations and conventional serial port operations, while the third type is asynchronous interactive device transfers, such as keyboard, mouse, pointing device, pen interfaces, and the configuration and status information, generally referred to as the control information, of the various devices. The fourth type is a polling or interrupt type which is used to periodically access a device to determine if it has any status change to report back to the controlling software of the device.

Information is broadcast over the serial bus system from the host controller in a series of packets, with the host controller acting as the bus master and hubs and devices only responding upon request or polling access of the host controller. The packet types include data packets, token packets for use from host to device, a handshake packet and a special control packet. Data packets are the isochronous, asynchronous block, and asynchronous control types. Token packets allow transfer of data packets. Handshake packets are used to perform a ready handshake after transfer of a data or control packet to acknowledge successful receipt or indicate unsuccessful receipt. Special control packets are used for logical reset and status request transfers. Each function or device has a logical address.

Each device and port on a hub or the host controller includes the capabilities to handle the low level bus transfer protocol between the particular node of the appropriate hub and the device itself. Thus, a relatively simple transfer protocol, with a limited number of packet types is defined.

The hubs act as wiring concentrators and enable the attachment of multiple serial bus devices to the serial bus. A hub repeats incoming traffic from any enabled port by broadcasting the traffic transparently to all other enabled ports on the hub. As a result, the tree structured interconnect topology appears as a flat "virtual bus" with no store-and-forward type delays.

The functions connected to the hubs have various bus bandwidth requirements. While some devices, such as video and audio, may have relatively high bus bandwidth requirements, other devices, such as mice and keyboards, may have very low data bandwidth requirements. As a result, these low speed functions do not need the same interface requirements as a faster function, not only for performance reasons but also for cost reasons. Therefore, it would be desirable to have an interface compatible with the serial bus, but operating at a slower rate and costing much less to implement.

SUMMARY OF THE PRESENT INVENTION

A low speed serial bus portion according to the present invention utilizes circuitry and a low speed serial bus protocol to provide an inexpensive alternative to the standard serial bus interface. The serial bus comprises a host controller communicating in a tree-like structure with numerous devices, hubs and functions. Hubs, having ports, are used to provide additional fan-out to more functions or devices. The connection between a low speed function and a port establishes a low speed interface. In the preferred embodiment, circuitry on an upstream hub senses the low speed function and modifies its signaling from conventional serial bus signaling to signaling according to the present invention.

A low speed function connected to the serial bus receives a clock signal from the hub. Data is received by the low speed function from the hub device over a bidirectional data line. The low speed function also provides data to the hub over the same data line. The low speed function may utilize a 5V power line, provided by the serial bus, without a regulator by adapting a 5V data signal from the low speed function to a 3.3V compatible data signal by a resistor divider circuit.

In the preferred embodiment, the low speed portion of the serial bus utilizes a two-wire protocol for communications between the low speed function and the hub. A data transfer has a starting and ending handshaking protocol for acknowledging transfers. Terminations and retries are also supported.

As the low speed serial bus portion transfers are performed at a slower clock frequency, a circuit is provided in the hub for reducing latency by making more bandwidth available on the serial bus and reducing costs in the function, as compared to a full serial bus interface. Data transfers between the low speed function and the hub are serially registered so that when the serial register is full, a transfer from the hub to the host controller will be fast and efficient.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
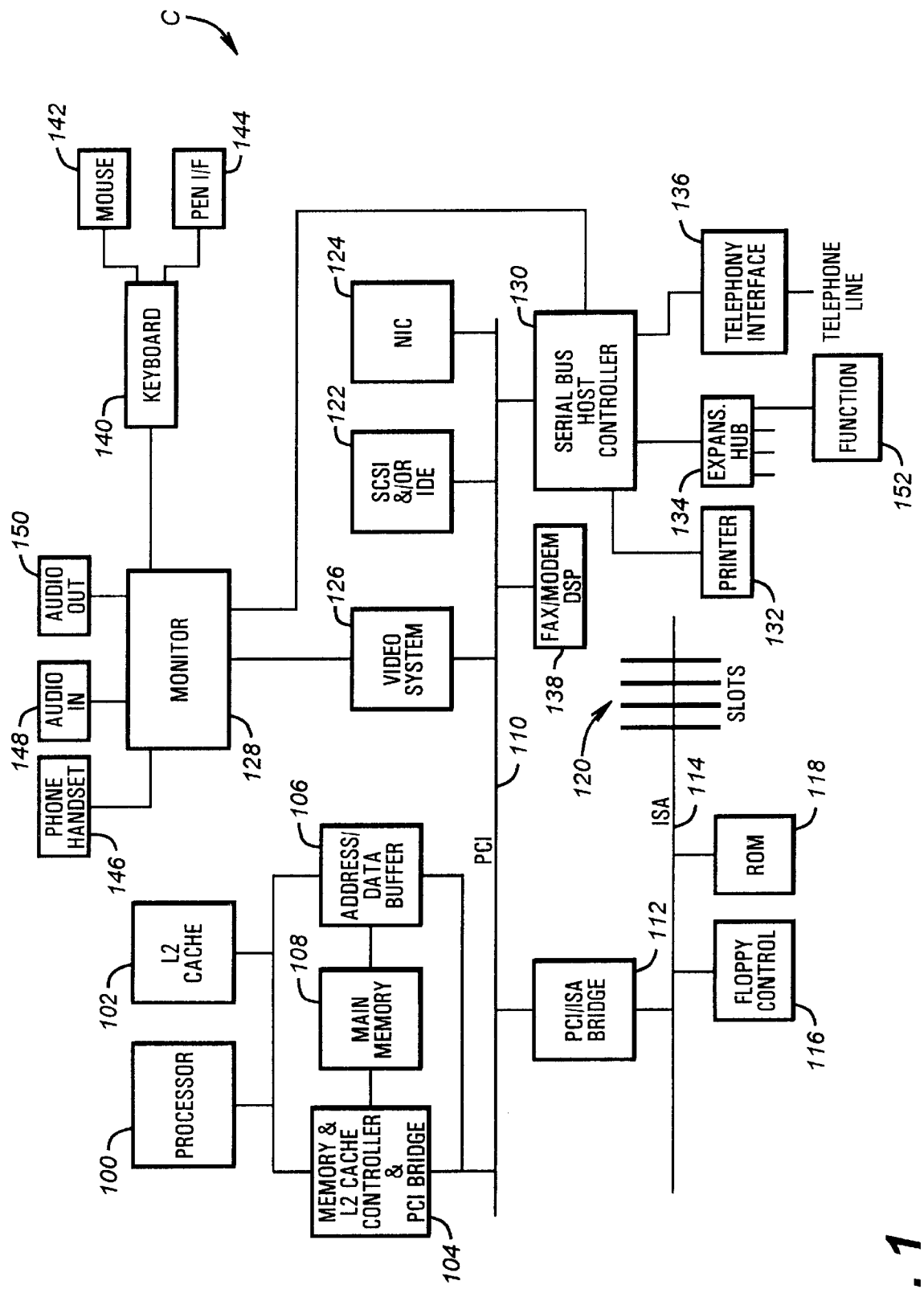
FIG. 1 is a block diagram of a computer system incorporating a serial bus system according to the preferred embodiment.

Referring now to FIG. 1, the computer system C according to the preferred embodiment is generally shown. The computer system C includes a processor 100 such as a Pentium® or 486 processor by Intel or their equivalents. It is understood that other processors could of course be utilized. The processor 100 is connected to a second level or L2 cache 102 and to a memory and L2 cache controller and PCI bridge 104 and address and data buffer 106. The main memory 108 of the computer system C is connected between the memory and L2 cache controller 104 and the address and data buffer 106. It is understood that the processor 100, cache 102, memory and cache controller 104, address and data buffer 106 and main memory 108 form the processor system and processor to PCI bus bridge according to a PCI system. It is understood of course that alternate processor systems and high speed bus architectures could be utilized if desired. Further, the address buffering could be included in the PCI bridge 104.

The PCI bridge 104 and address and data buffer 106 are connected to a PCI bus 110 which performs the high speed high performance back bone of the computer system C. A PCI to ISA (Industry Standard Architecture) bridge 110 is connected between the PCI bridge 110 and an ISA bus 114. A floppy disk controller 116 is connected to the ISA bus 114, as is the system ROM (read only memory) 118. Additionally, there may be a plurality of ISA slots connected to the ISA bus 114 for receiving interchangeable cards.

The majority of the devices are connected to the PCI bus 110. For example, a SCSI or IDE (Intelligent Drive Electronics) controller 122 is connected to the PCI bus 110 and to the associated disk drives and other devices (not shown). A network interface card (NIC) 124 is also connected to the PCI bus 110 to allow high performance network connections. Further, a video graphics system 126 is connected to the PCI bus 110 and to an associated monitor 128. A fax/modem DSP (digital signal processor) 138 can also be connected to the PCI bus 110 for fax and modem data processing. As noted, this is an exemplary computer system architecture and is provided for explanation, variations being readily apparent to one skilled in the art.

Of interest to the present description, a serial bus host controller 130 is also connected to the PCI bus 110. The serial bus host controller 130 of the illustrated embodiment acts as both a host controller and a hub, with various hubs and functions connected to the host bus controller 130. For example, a printer 132 is connected to one port of the serial bus host controller 130, while an expansion hub 134 is connected to a second port. The expansion hub 134 provides further expansion capabilities, such as connecting to a low speed function 152 according to the present invention. This connection will be described in more detail below. A telephony interface 136 containing the necessary CODEC and DAA components is connected to a third port and also receives a telephone line. The telephone line can be any of the available types such as an analog line, an ISDN line, a PBX connection and so on.

In the illustrated embodiment, the monitor 128 further acts as a hub and as a node. The monitor 128 is thus connected to one port of the serial bus host controller 130. The node or device function of the monitor 128 allows configuration of the monitor 128 independent from the high speed data utilized in the video system 126. The monitor 128 preferably acts as a hub because of the conventional physical arrangement of a modern computer system. Preferably, the system unit which contains the other devices is located under the desk or in a relatively remote location, with only the monitor 128, a keyboard 140, a pointing device such as a mouse 142 or pen 144, a telephone handset 146, and microphone and speakers relatively accessible to the user. As the monitor 128 effectively forms the central core of this unit, it is logically a proper location for a hub. The telephone handset 146 could be connected to one port of the monitor hub to receive digitized analog information either directly from the telephony interface 136 or as otherwise available, such as from an answering machine or voice mail function. The microphone is part of audio input circuitry 148 which is connected to a second port of the monitor hub, while audio output circuitry 150 contains the speakers used for audio output. The keyboard 140 further acts as a hub itself and a node, in that it is connected to the monitor hub but further contains ports to connect to the mouse 142 and a pen or stylus pointing device interface 144. This further physical connection is appropriate as those are the primary input devices and they are in most cases generally relatively near the keyboard 140 to ease use of operation. In all cases, each one of the particular devices connected over the serial bus system includes control ports and configuration registers which need to be accessed by the processor 100 via the serial bus host controller 130 to allow control and setup of the individual devices. Thus it can be seen that in the computer, the relatively lower data rate functions are connected to the serial bus host controller 130 according to the serial bus system.

Figure 2:
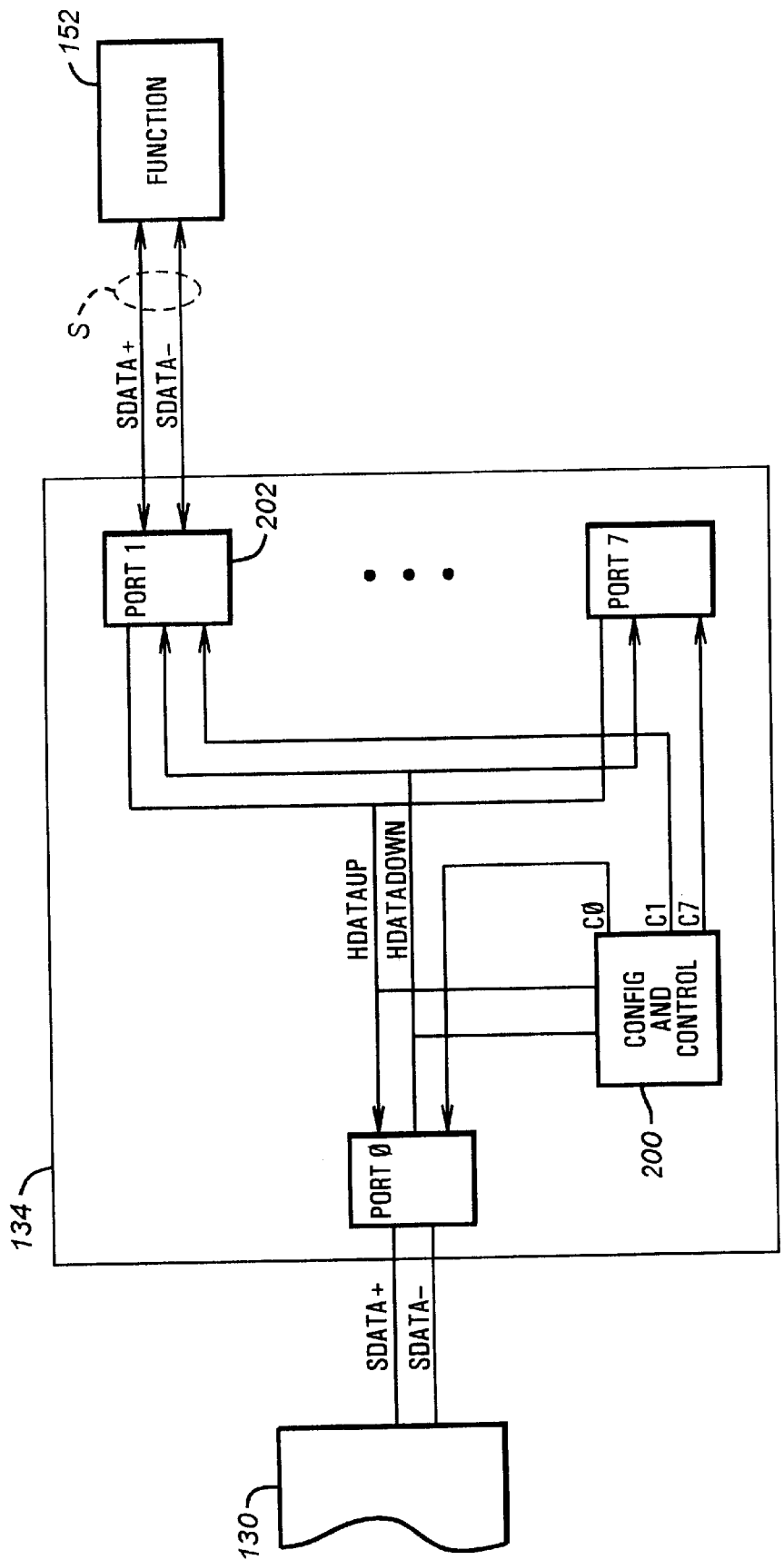
FIG. 2 is a detailed block diagram illustrating a connected hub according to the preferred embodiment.

FIG. 2 is a more detailed block diagram of the expansion hub 134. It is understood that while the following description refers specifically to expansion hub 134, any hub or host controller of the serial bus may contain the features discussed herein. In the nomenclature of the serial bus, an "upstream" port is the port closest to the host controller 130 of two connected ports, while a "downstream" port is a port opposite an upstream port. Generally, a hub may contain up to eight ports, with port 0 defined as the upstream port relative to the other hub ports. Ports 1–7 are defined as the downstream ports relative to the hub upstream port, but are defined as upstream ports relative to a device connected to them. A hub downstream port may connect to a function or another hub.

The expansion hub 134 contains a port 0 for connecting to upstream devices, such as the host controller 130, and ports 1–7 for connecting to downstream devices, such as the function 152. Each port may send or receive data as configured by configuration and control logic 200. Internally, each port is connected by a pair of data signals. Data received by port 0 for downstream devices is transmitted by a HDATADOWN signal. Data received by the downstream ports (ports 1–7) for the host controller 130 is transmitted by a HDATAUP signal. Each port contains buffers for passing data with minimal delay and without latching.

Only one port at a time may be enabled for receiving data from connected devices. The configuration and control logic 200 monitors the HDATAUP and HDATADOWN signals to determine which ports to enable and the data direction. Ports 0–7 default to a configuration where data is transferred in a downstream direction from the host controller 130. Each port receives control signals from the configuration and control logic 200. Port 0 receives control signals C0, port 1 receives control signals C1, and so on up to port 7 receiving control signals C7.

Externally, each port is connected to a device by a pair of differential lines. Port 1 202 of the expansion hub 134 is shown connected to the function 152 by a SDATA+ line and a SDATA− line, as does port 0. These lines carry information between the devices and are discussed more fully below. In addition to the SDATA+ and SDATA− lines, the serial bus cabling provides a VCC and ground signal (not shown) to each device on the serial bus. Collectively these lines are called the serial bus S. The 5V VCC provides limited power to serial bus devices. Each device receiving power from the serial bus is typically required to provide a regulator for generating an internally regulated 3.3V power line.

Figure 3:
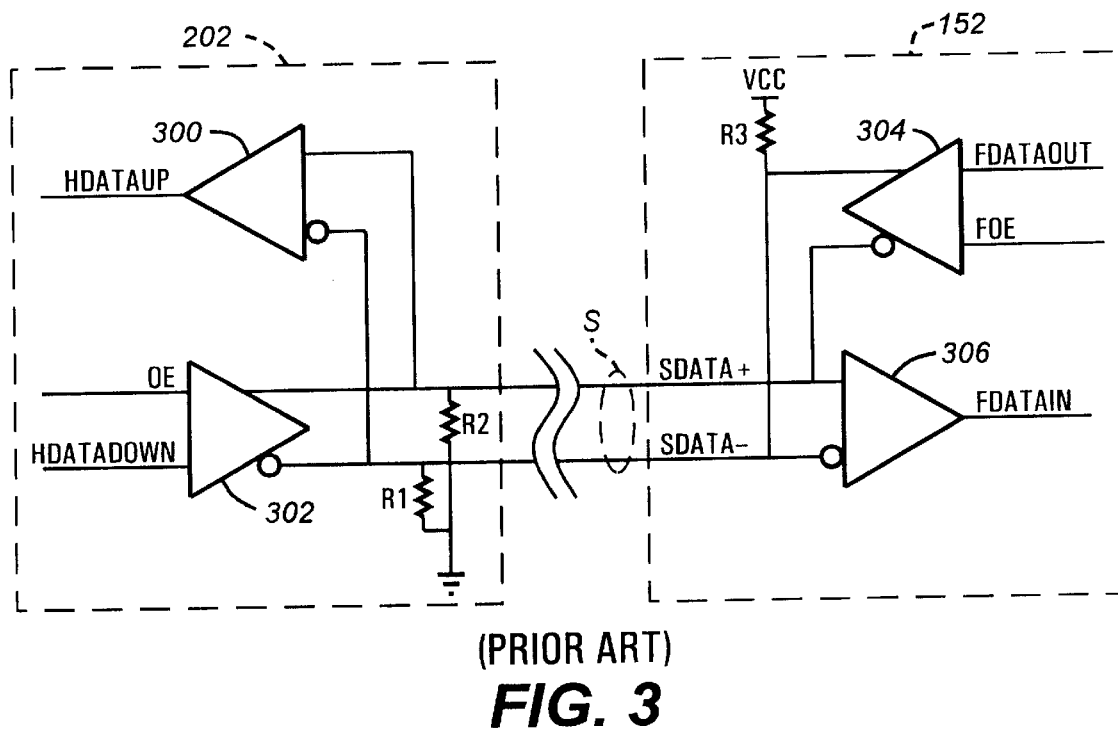
FIG. 3 is a schematic diagram of the serial bus wiring and buffer configuration according to the prior art.

FIG. 3 illustrates the prior art port drivers for communicating over the two-wire serial bus. Port 202 of the expansion hub 134 and the port of the function 152 are shown for exemplary purposes, but it is understood that any ports can contain the features herein discussed. The signaling for the serial bus is comprised of a two-wire balanced differential transmission line. Each port converts 3.3V CMOS level signals into differential signals for driving over the external serial bus cable S.

A logical one is represented by SDATA+ being at least 1.0V more positive than SDATA− and a logical 0 is represented by SDATA− being at least 1.0V more positive than SDATA+. Between packet transmissions the drivers are generally in a high impedance state.

In port 202, a differential line driver 302 receives the downstream data signal (HDATADOWN) and converts the signal into the differential lines SDATA+ and SDATA− when an output enable (OE) signal is asserted. A non-inverted output of the differential line driver 302 is connected to the SDATA+ line and an inverted output is connected to the SDATA− line. A differential line receiver 300 receives the serial bus S lines for converting the differential lines SDATA+ and SDATA− into the upstream data signal (HDATAUP). A non-inverted input of the differential line receiver 300 is connected to the SDATA+ line and an inverted input is connected to the SDATA− line.

The upstream port 202 contains pull-down resistors on both the SDATA+ and SDATA− lines. A resistor R1, preferably having a resistance of 15K ohms, is connected to the inverted output of the differential line driver 302 with the other end of the resistor R1 connected to ground. A resistor R2, preferably having a resistance of 15K ohms, is connected to the non-inverted output of the differential line driver 302 with the other end connected to ground. When port 202 of the hub is unconnected, the pull-down resistors cause both the SDATA+ and SDATA− signals to be pulled to ground potential. This creates a single-ended logical 0 input on the HDATAUP line which indicates a disconnect condition if it persists long enough.

In function 152, a differential line receiver 306 receives the serial bus S lines for converting the differential lines SDATA+ and SDATA− into a received data signal (FDATAIN). A non-inverted input of the differential line receiver 306 is connected to the SDATA+ line and an inverted input is connected to the SDATA− line. A differential line driver 304 receives output data from the function (FDATAOUT) for converting the signal into the differential lines SDATA+ and SDATA− when the driver is enabled (FOE). A non-inverted output of the differential line driver 304 is connected to the SDATA+ line and an inverted output is connected to the SDATA− line.

The function 152 also contains a pull-up resistor R3, preferably having a resistance of 1.5K ohms, connected to the non-inverted output of the differential driver 304. When the drivers 302 and 304 are in a high impedance state, the resistors R1, R2 and R3 create a quiescent bias condition on the lines with SDATA+ near VCC of the downstream device (152) and SDATA− at the ground potential of the upstream device (134).

The serial bus S signals are preferably driven with CMOS transceivers of 45 ohms into a cable of 90 ohms. The signaling rate is preferably 12 Mb/s. The clock encoding scheme is NRZI (non-return to zero) with bit stuffing. Each function synchronizes itself to the serial bus to receive and transmit data. Thus, with the NRZI encoding scheme, the serial bus inherently requires a function to contain a clock oscillator. Additionally, the cabling required for the relatively high speed signaling rates is twisted shielded pair.

Many devices connected to the serial bus have very low bandwidth and data rate requirements. It is therefore desirable to have a less expensive alternative for these low speed devices that eliminates the oscillator, regulator and the need for the more expensive shielded cabling. For example, costs are reduced by replacing the oscillator with a resonator. It is therefore desirable for circuitry to be developed to recognize a low speed device connection and provide a protocol in which the function can communicate inexpensively over the serial bus.

Figure 4:
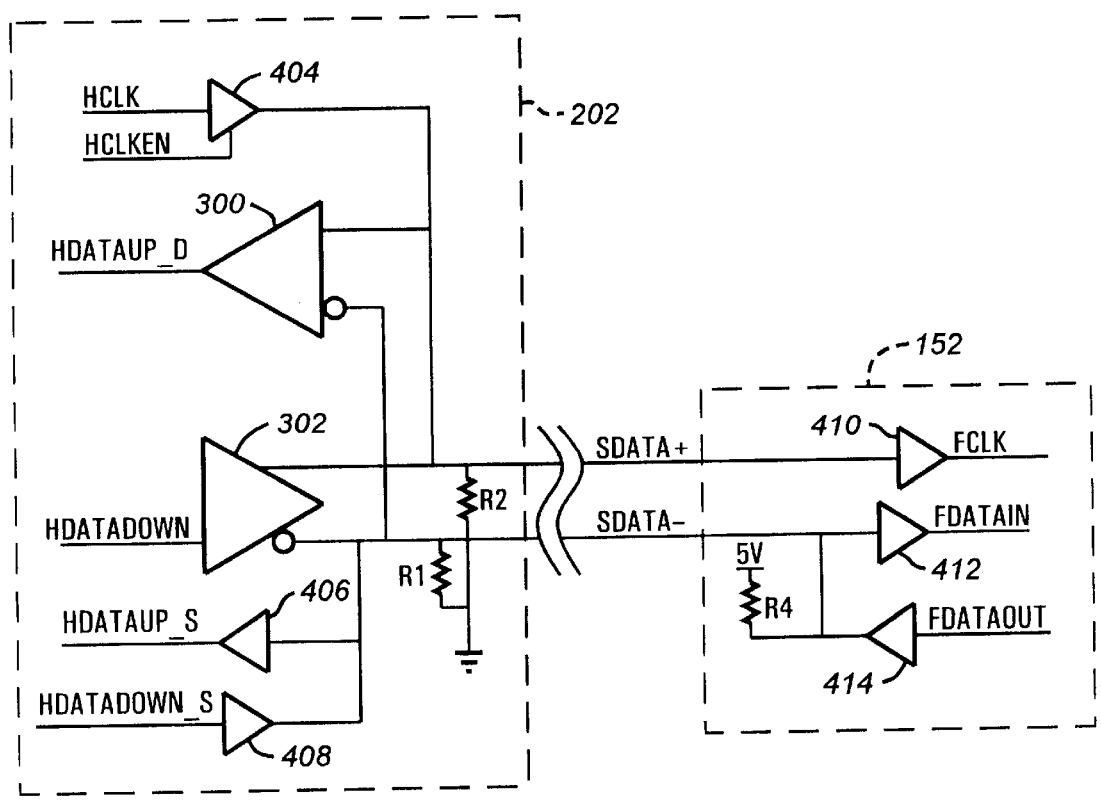
FIG. 4 is a schematic diagram of a low speed serial bus wiring portion and driver circuitry according to the preferred embodiment.

FIG. 4 illustrates port drivers of the preferred embodiment of the present invention. In this illustration, the downstream port 202 of the expansion hub 134 includes additional low speed logic for communicating with a low speed function 152. The same two transmission lines, SDATA+ and SDATA− are used, however, since the data rates over the cable are low speed, existing inexpensive cables, such as unshielded, twisted pair, can be used.

The low speed function 152 includes a resistor R4 connected to VCC at one end and the SDATA− line at the other end. Referring back to FIG. 3, it can be seen that the SDATA+ line would be pulled-up if a non-low speed device were connected. According to the invention, when the low speed function 152 is connected to the serial bus (port 202 in this example), sensing logic 508 (FIG. 5) in the downstream port 202 senses the SDATA− line pulled up to VCC and determines that a low speed function is connected instead of a normal speed function. The expansion hub 134 then configures the port 202 for low speed operations by disabling the differential receiver 300 and driver 302 and enabling the low speed buffers, as discussed below.

In low speed operation, the serial bus S lines change characteristics. The SDATA+ line carries a low frequency clock (CLK) signal and the SDATA− line carries a data signal. The clock signal (SDATA+) is only driven by the expansion hub 134, and thus is provided at the required 3.3V. The data signal (SDATA−) is bidirectional. When driven by the port 202, the signaling is at a 3.3V level. Because it is desirable to power the function 152 directly from the 5V VCC line in the serial bus cable, without regulation, it is necessary to convert the data signal driven from the function 152 to a 3.3V signal. By driving the SDATA− signal with an open drain output and by selecting the value of resistor R4 to be ½ of the value of resistor R1, a voltage of not greater than 3.6V will be received by port 202. Thus, 3.3V signaling is achieved in both directions.

In port 202, in addition to the differential drivers previously discussed, the SDATA− line is further connected to the output of an open drain data buffer 408 and the input of a data buffer 406 for receiving and transmitting data. The SDATA+ line is further connected to the output of a tristate clock buffer 404. When sensing logic 508 determines that a low speed function is connected, a clock buffer enable (HCLKEN) signal is asserted to enable the clock buffer 404.

In the port of the low speed function 152, in addition to the resister R4 previously discussed, the SDATA− line is connected to the input of a data buffer 412 for providing data (FDATAIN) to the low speed function and connected to the output of an open drain data buffer 414 for transmitting the function data (FDATAOUT) to the host controller 130. The SDATA+ line is connected to the input of a clock buffer 410 for providing a low frequency clock signal (FCLK) to the low speed function. When the host controller 130 is transmitting to the low speed function 152, data buffers 408 and 412 are utilized and data buffers 406 and 414 are open, or not driving. When the low speed function is transmitting to the host controller 130, data buffers 414 and 406 are utilized, with data buffers 408 and 412 open.

Thus, the two-wire serial bus changes transmission characteristics when a low speed function is connected to a downstream port. The resistor R3 in FIG. 3 and the resistor R4 in FIG. 4 allow the port 202 to determine whether the attached function is low speed or not and to convert a 5V level to a 3.3V compatible level. Operation of the circuitry will be clear from the description of the low speed circuitry of the port 202.

Figure 5:
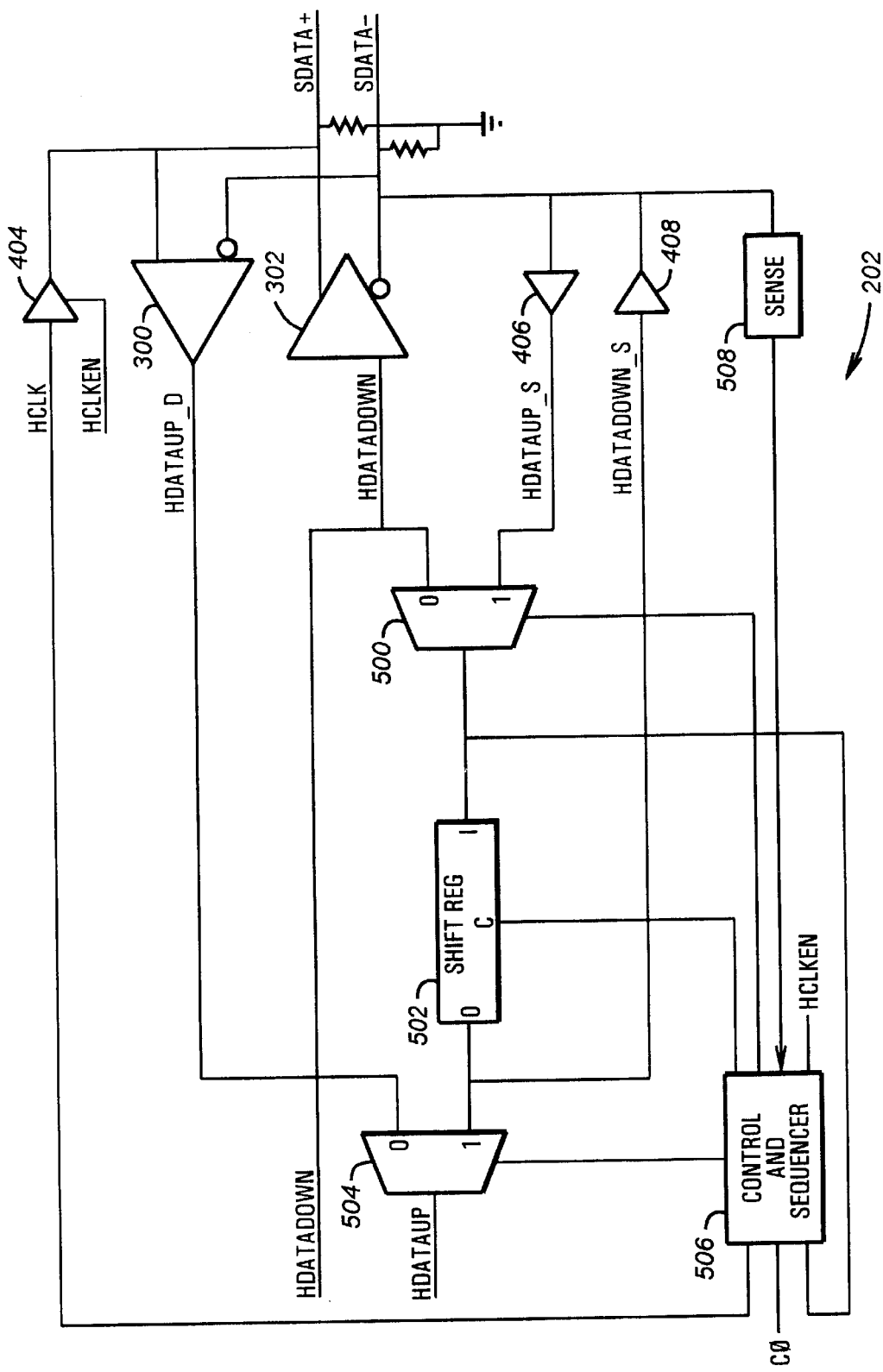
FIG. 5 is a block diagram of low speed data buffer circuitry according to the preferred embodiment.

FIG. 5 illustrates circuitry, according to the preferred embodiment, contained in each downstream port to support communication with low speed functions. The circuitry is preferably used only when communicating with low speed functions, however, it is contemplated that all transfers could benefit from the additional circuitry. By collecting the low speed data into a serial shift register 502, the low speed transfers are isolated from the higher speed serial bus transfers, and thus, bus throughput is maintained. Data is collected in both directions.

First, during transfers from the host controller 130 to the low speed function 152, data is buffered in the serial shift register 502 for transmitting to the low speed function 152 at the slower clock rate. Data is received into port 202 of the expansion hub 134 through the HDATADOWN signal. The HDATADOWN signal connects to the data input of a differential driver 302 and a zero input of a multiplexer 500. Data flows through the multiplexer 500 into the serial shift register 502. Preferably the serial shift register is eight or sixteen bits in length, but larger buffers could also be used. The output of the serial shift register 502 is connected to a one input of a multiplexer 504 and the input of the output data buffer 408.

A sequencer 506 receives control signals (C0), a clock signal (HCLK) from the hub configuration and control logic 200 and the output of the multiplexer 500 and provides the HCLKEN signal for controlling the data transfers with the low speed function. The clock signal is preferably of a frequency between 10 and 40 kHz, the lower end of which can be obtained by dividing the serial bus clock by 1024. The clock signal is also provided to the clock output buffer 404. After the serial shift register 502 is full, the sequencer 506 will cause the host controller 130 to receive an acknowledgment of the data transfer. Thereafter, the sequencer 506 controls the low speed transfer between the port 202 and the low speed function 152 without slowing down the serial bus.

Next, during transfers to the host controller 130 from the low speed function 152, data is again buffered in the serial shift register 502 for transmitting to the host controller 130. Data is received into port 202 through the data input buffer 406 and into a one input of the multiplexer 500. Data flows through the multiplexer 500 and into the serial shift register 502 for collection. From the serial shift register 502, the outgoing data flows through the one input of the multiplexer 504 to provide the HDATAUP signal. As shown in FIG. 2, the HDATAUP signal is received into port 0 and converted into differential signals SDATA+ and SDATA−.

The sequencer 506 controls the data transfer between the port 202 and the low speed function 152. When the serial shift register 502 is full, the sequencer 506 causes the host controller 130 to be notified that a packet is ready to be sent at the next polling interval. Thereafter, upon command from the host controller 130, the sequencer 506 controls the port 202 during the transmission of data to the host controller 130.

Thus, if a low speed function is connected to the port 202, data to the function is transferred over the HDATADOWN signal to the zero input of the multiplexer 500 to the shift register 502 and finally to the output buffer 408. Data is transferred from the function over the SDATAIN− line to the buffer 406 to the one input of the multiplexer 500 to the shift register 502 to the one input of the multiplexer 504 and finally to the HDATAUP signal.

If a low speed function were not connected to the port 202, the low speed circuitry would not be enabled. The downstream data signal HDATADOWN would be transmitted by the driver 302 and the upstream data signal (HDATAUP_D), received by the receiver 300, would be passed through a zero input of the multiplexer 504 to provide the HDATAUP signal.

Therefore, the additional circuitry enables low speed operations between a port and a function while permitting the serial bus to operate a normal speeds. Since low speed communications operate differently from the normal serial bus transfers, a different protocol is required.

Figure 6:
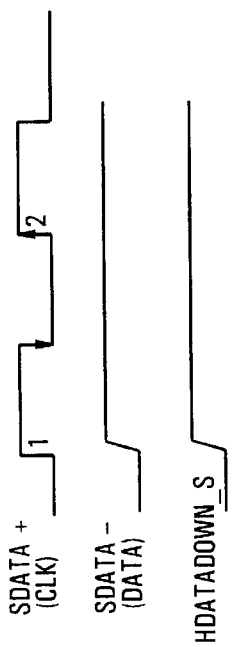
FIG. 6 is a timing diagram according to the preferred embodiment illustrating a low speed serial bus portion in which permission is granted, but no transfer occurs.
Figure 7:
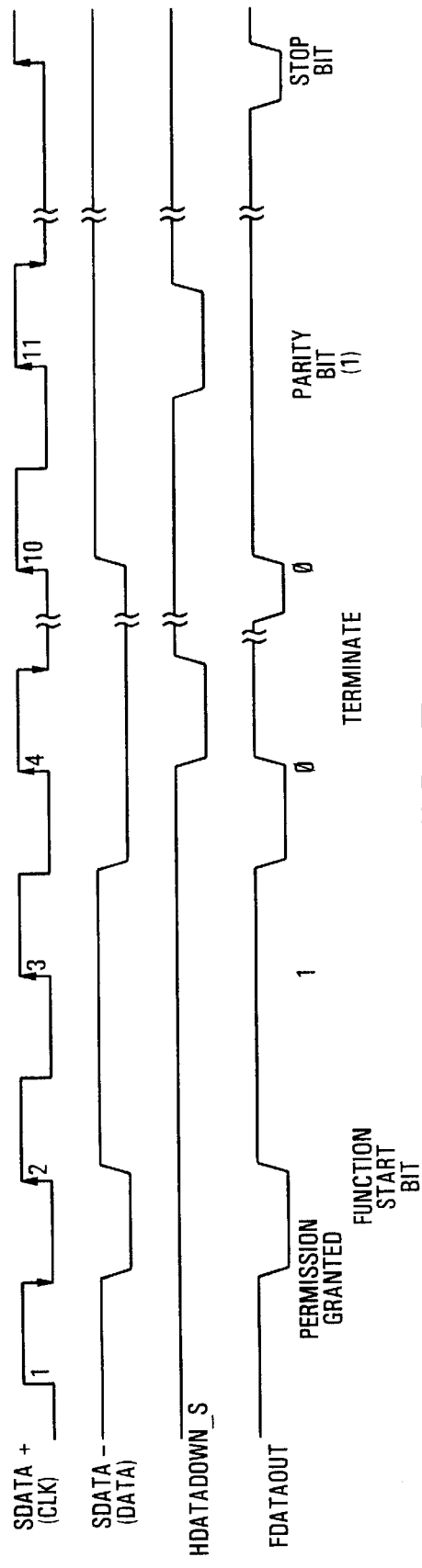
FIG. 7 is a timing diagram according to the preferred embodiment illustrating the low speed serial bus portion in which: permission is granted, the function begins a data transfer, and the transfer is aborted by the hub; and the end of a transfer in which the completed transfer is acknowledged by the hub.
Figure 8:
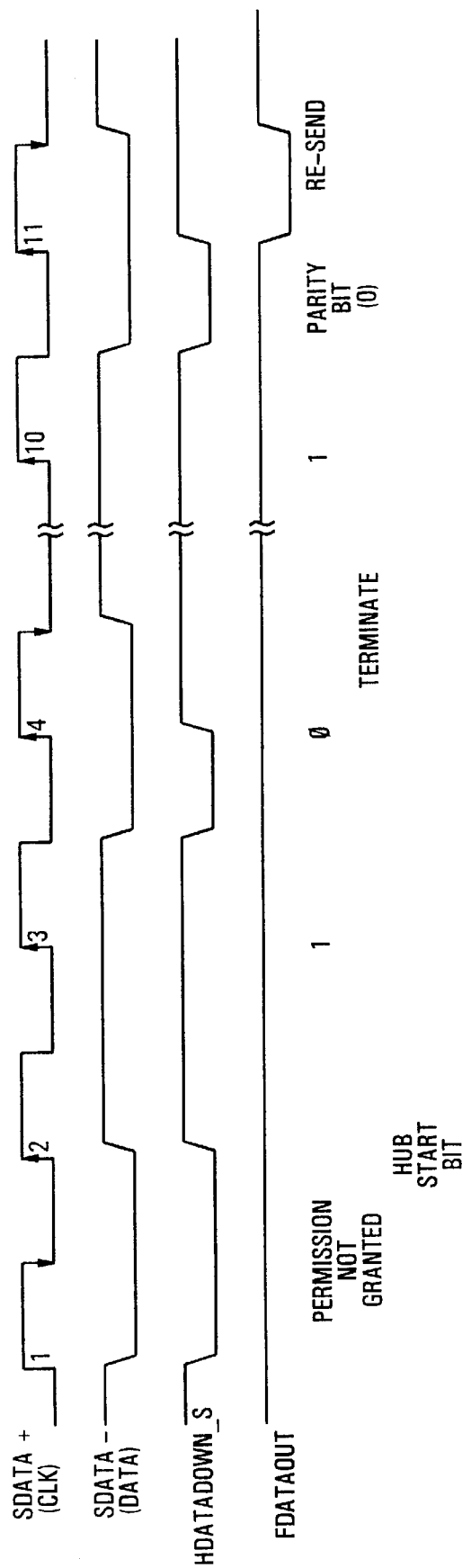
FIG. 8 is a timing diagram according to the preferred embodiment illustrating the low speed serial bus portion in which: permission is not granted, the hub begins a data transfer, and the transfer is aborted by the function; and the end of a second transfer in which the completed transfer is acknowledged by the function.

FIGS. 6, 7 and 8 are timing diagrams that illustrate the low speed serial bus protocol. The figures refer to the CLK signal, which is also known as the SDATA+ line in low speed operations. Because either the hub or the low speed function may drive the serial bus data line SDATA−, the hub data signal HDATADOWN_S, and function data signal FDATAOUT are shown to clarify which device is driving the SDATA− line. As the output buffers 408 and 414 have open drain outputs, and due to resistor R4, the SDATA− line floats high if not driven.

FIG. 6 illustrates the idle state of the low speed data bus in which neither the hub nor the function are driving the SDATA− line. In this case, the resistor R4 pulls the line high. When the SDATA− line is high at the falling edge of clock 1, permission is granted to the function for driving the SDATA− line. To accept permission, the function would then drive the SDATA− line low before clock 2. The SDATA− line low at clock 2 indicates to the hub that the function is driving the SDATA− line and sending it data. In FIG. 6 however, since FDATAOUT is not driven, no request is received. Thus, by monitoring the SDATA− line at appropriate times, data direction can be determined.

FIG. 7 illustrates a transfer from the low speed function to the hub. Clocks 1–4 illustrate the beginning and termination of a function to hub transfer, while clocks 10–11 illustrate a normally completed function to hub transfer. For the function to pass data over the low speed serial bus, it must wait for permission, as described above. At the falling edge of clock 1 the function samples the SDATA− line high, indicating permission is granted. To begin a transfer, the function immediately drives the SDATA− line low to indicate a start bit. At clock 2 the hub samples the SDATA− line low and prepares to receive the remaining data.

During the data transfer, the function will drive the SDATA− bus during the low period of the clock cycle and the hub may drive the SDATA− line during the high period of the clock. If before the parity bit is sent the function samples the SDATA− line low on the falling edge of the clock, it will terminate the data transfer, as this indicates a request by the hub to transmit data.

At the rising edge of clock 3 the hub samples the first data bit (1). At the rising edge of clock 4 the hub samples the second data bit (0). After the rising edge of clock 4 in the illustration, the hub drives the SDATA− line low to terminate the transfer. At the falling edge of clock 4 the function samples the SDATA− line low and terminates the transfer.

If the transfer had not been terminated, it would continue to completion as shown in clocks 10–11. At clock 10 the last data bit, preferably the MSB, (0) is sampled by the hub. If parity checking is enabled, a parity bit is latched by the hub at clock 11. At this point, if parity checking is enabled, the hub performs a parity check and other transfer processing checks. If parity is not enabled then the parity bit transfer at clock 11 is omitted. To complete the transfer, the hub drives a stop bit onto the SDATA− line that is sampled by the function. However, before the stop bit is driven, the data is sent to the host controller for parity checking and other processing. Thus, until the hub receives an indication from the host controller 130, the clock signal is held low. Once the host controller 130 indicates that the data has been received correctly, the hub acknowledges the data transfer by driving CLK high and SDATA− low. If the transfer is in error, the SDATA− line is driven or floated high to indicate to the function that the data should be resent. In the illustrated transfer, the SDATA− line is low indicating successful completion.

FIG. 8 illustrates a transfer from the hub to the low speed function. Clocks 1–4 illustrate the beginning of a function to hub transfer, while clocks 10–11 illustrate the final data bits followed by a resend indication. For the hub to begin transferring data to the low speed function, permission must not be granted to the function. As such, at clock 1 the hub drives the SDATA− line low to indicate a transfer. At the falling edge of clock 1, the function samples the SDATA− line low and determines that the hub is beginning a transfer. At the rising of clock 2 the function samples the start bit (low) driven from the hub. Next, on each rising clock edge 3,4 a data bit is latched into the function.

In the illustrated transfer, at a rising clock edge 10, the final data bit (1) is latched into the function. If parity is enabled, a parity bit will next be latched by the function at a rising clock edge 11. At this point, if parity is enabled, the function performs a parity check and other processing. If the data transfer is not successful, the function will drive the SDATA− line low during the high period of a clock 11. It is noted that if parity is not enabled then the function will indicate an unsuccessful transfer during the high period of the clock cycle following the last data bit. If the transfer is successful, then the SDATA− line floats high (not shown) or may be driven high. In the illustrated transfer, the SDATA− line is low indicating an unsuccessful transfer. The hub samples the re-send bit at the falling edge of clock 11.

Thus, by driving a low frequency clock to the function, less expensive cabling can be used and a crystal oscillator is not required but rather a simple resonator circuit can be used to clock the function logic. The protocol provides a convenient method of transferring data between the function and a hub while providing a handshake to indicate initial ownership of the low speed portion of the serial bus, and handshakes indicating acknowledgement, termination and retries. Further, it can be readily determined if a conventional or low speed function is connected to the port by sensing the level of one of the data lines.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A hub for use with relatively low speed peripheral devices and for use in a serial bus system having high speed peripherals, the serial bus system transferring data at a relatively high data rate, the hub comprising:

a high speed data transferring circuit for transferring data with the serial bus system based on a high speed clock of the serial bus system;

a low speed clocking circuit for developing a low speed clock signal for use with the low speed peripheral devices; and a downstream port for connection to a peripheral device, said downstream port including:

a low speed peripheral detector;

a low speed data transferring circuit for transferring data back and forth with the low speed peripheral device based on said low speed clock; signal and a data buffer for buffering data between said high speed data transferring circuit and the low speed data transferring circuit of said downstream port when a low speed peripheral device is connected.

2. The hub of claim 1, wherein said downstream port further includes:

a bidirectional buffer connecting to a pair of serial bus lines for communicating data over said pair of serial bus lines; and a resistor having one end connected to a voltage source, wherein said serial bus device is detected as a low speed device if the other end of said resistor is connected to a first of said pair of serial bus lines, and wherein said serial bus device is detected as a high speed device if the other end of said resistor is connected to a second of said pair of serial bus lines.

3. The hub of claim 1, wherein s aid downstream port further includes:

a high speed data transferring circuit for transferring data back and forth with the high speed peripheral device based on the high speed clock.

4. The hub of claim 3, wherein said downstream port includes two conductors for signal transmission and resistors for pulling each of said conductors to ground, wherein said low speed peripheral detector is coupled to said conductors, wherein a low speed peripheral device is detected if one of said conductors is resistively pulled high when a device is attached, and wherein a high speed peripheral is detected if the other of said conductors is resistively pulled high when a device is attached.

5. The hub of claim 4, wherein the resistor of the high speed peripheral has a resistance much less than the resistance of said resistors of said downstream port and wherein the resistor of the low speed peripheral device has a resistance less than but not much less than the resistance of said resistors of said downstream port.

6. The hub of claim 3, wherein said low speed data transferring circuit utilizes a different signaling standard than that used by said high speed data transferring circuit.

7. The hub of claim 6, wherein said low speed data transferring circuit uses a single ended clock signal and a single ended, bidirectional data signal and said high speed data transferring circuit uses a differential, bidirectional signal using encoding of clock and data.

8. The hub of claim 3 wherein said downstream port further includes a high speed peripheral detector for detecting when a high speed peripheral device is connected.

9. The hub of claim 1 wherein the data buffer comprises a shift register.

10. A computer system comprising:

a processor;

a main memory coupled for access by the processor;

a bridge circuit coupled between the processor and an expansion bus;

a plurality of peripheral devices coupled to the expansion bus;

a serial bus interface coupled to the expansion bus;

a low speed peripheral device coupled to the serial bus interface;

a high speed peripheral device coupled to the serial bus interface, the high speed peripheral device communicating with the serial bus interface at a higher data rate than that of the low speed peripheral device;

wherein the serial bus interface includes:

a high speed data transferring circuit for transferring data with the serial bus system based on a high speed clock of the serial bus system;

a low speed clocking circuit for developing a low speed clock signal for use with the low speed peripheral devices; and a downstream port for connection to a peripheral device, said downstream port including:

a low speed peripheral detector;

a low speed data transferring circuit for transferring data with the low speed peripheral device based of the low speed clock; and a data buffer for buffering data between said high speed data transferring circuit and said downstream port when a low speed peripheral device is connected.

11. The system of claim 10 wherein the serial bus interface comprises a hub.

12. The system of claim 11 wherein the hub is integrated in a display device.

13. The system of claim 12 and further comprising a keyboard coupled to the hub integrated in the display device.

14. The system of claim 12 and further comprising a video controller coupled to the display device, the video controller connected to the expansion bus.

15. The system of claim 10 wherein the expansion bus comprises a PCI bus.

16. The system of claim 10 wherein one of the peripheral devices coupled to the expansion bus comprises a disk drive.

17. A hub for use with relatively low speed peripheral devices and for use in a serial bus system having high speed peripherals, the serial bus system transferring data at a relatively high data rate, the hub comprising:

means for transferring data with the serial bus system based on a high speed clock of the serial bus system;

means for developing a low speed clock signal for use with the low speed peripheral devices; and a downstream port for connection to a peripheral device, said downstream port including:

a low speed peripheral detector;

means for transferring data with the low speed peripheral device based of the low speed clock; and means for buffering data between said high speed data transferring circuit and said downstream port when a low speed peripheral device is connected.

18. The hub of claim 17 wherein the downstream hub further includes means for transferring data with the high speed peripheral device based on the high speed clock.

19. The hub of claim 18, wherein the downstream hub further includes means for detecting when a high speed peripheral device is connected.

20. A serial hub comprising:

a downstream port, the downstream port operable to be coupled to either a high speed peripheral device or a low speed peripheral device, the low speed peripheral device operating at a data rate less than the data rate of the high speed peripheral device;

a high speed input element with an input coupled to the downstream port;

a low speed input element with an input coupled to the downstream port;

a storage device with an input coupled to an output of the low speed input element; and a serial bus interface including first and second inputs and an output, wherein the first input is coupled to an output of the high speed input element, the second input is coupled to an output of the storage device, and the output is operable to be coupled to a high speed serial bus.

21. The hub of claim 20 wherein the storage device comprises a shift register.

22. The hub of claim 20 wherein the serial bus interface includes a multiplexer.

23. The hub of claim 20 wherein the serial bus comprises a serial bus disposed on the motherboard of a computer system.

24. The hub of claim 20 wherein the high speed input element comprises a differential line driver, the differential line driver including differential inputs operable to be coupled to the high speed peripheral device.

25. The hub of claim 20 wherein the low speed input element includes a data buffer with an input operable to be coupled to the low speed peripheral device.

26. The hub of claim 20 and further comprising a low speed clocking circuit for use with the low speed input element.

27. The hub of claim 20 and further comprising:
a high speed output element with an output coupled to the downstream port; and
a low speed output element with an input coupled to the downstream port.

28. The hub of claim 27 wherein the input of the low speed output element is coupled to the output of the storage device.

29. The hub of claim 20 and further comprising a sense circuit coupled to the downstream port, the sense circuit operable to determine whether a peripheral device coupled to the downstream port is a high speed peripheral device or a low speed peripheral device.

30. The hub of claim 29 wherein the downstream port includes first and second conductors for signal transmission and resistors for pulling each of the conductors to ground, wherein the sense circuit is coupled to at least one of the first and second conductors, and wherein a low speed peripheral device is detected if the first conductor is resistively pulled high relative to the second conductor when a device is attached, and wherein a high speed peripheral is detected if the second conductor is resistively pulled high relative to the first conductor when a device is attached.

31. The hub of claim 20 wherein the high speed input element utilizes a different signaling standard than that used by the low speed input element.

32. The hub of claim 31 wherein said low speed input element uses a single ended clock signal and a single ended, bi-directional data signal and said high speed input element uses a differential, bidirectional signal using encoding of clock and data.

33. The hub of claim 20 in combination with a high speed peripheral device.

34. The hub of claim 20 in combination with a low speed peripheral device.

35. A computer system comprising:
a processor;
a main memory coupled for access by the processor;
a bridge circuit coupled between the processor and an expansion bus;
a plurality of peripheral devices coupled to the expansion bus;
a serial bus controller coupled between the expansion bus and a serial bus;
a serial hub coupled to the serial bus;
a low speed peripheral device coupled to a first port of the serial hub;
a high speed peripheral device coupled to a second port of the serial hub, the high speed peripheral device communicating with the serial hub at a higher data rate than that of the low speed peripheral device;
wherein the serial hub comprises:
a first high speed input element with an input coupled to the first port;
a first low speed input element with an input coupled to the first port;
a storage device with an input coupled to an output of the first low speed input element; and
a serial bus interface including first and second inputs and an output, wherein the first input is coupled to an output of the first high speed input element, the second input is coupled to an output of the storage device, and the output is coupled to the serial bus.

* * * * *